(12) United States Patent
Nielsen et al.

(10) Patent No.: US 9,806,940 B1
(45) Date of Patent: Oct. 31, 2017

(54) DEVICE METERING

(71) Applicant: comScore, Inc., Reston, VA (US)

(72) Inventors: Steve Nielsen, Oswego, IL (US); Lucas Ewalt, Chicago, IL (US)

(73) Assignee: comScore, Inc., Reston, VA (US)

( * ) Notice: Subject to any disclaimer, the term of this patent is extended or adjusted under 35 U.S.C. 154(b) by 545 days.

(21) Appl. No.: 13/649,427

(22) Filed: Oct. 11, 2012

Related U.S. Application Data (60) Provisional application No. 61/546,670, filed on Oct. 13, 2011.

(51) Int. Cl.
*G06F 15/177* (2006.01)
*H04L 12/24* (2006.01)
*H04L 12/46* (2006.01)

(52) U.S. Cl.
CPC ...... *H04L 41/0803* (2013.01); *H04L 12/4641* (2013.01)

(58) Field of Classification Search
CPC . H04L 63/20; H04L 63/0272; H04L 63/0823; H04L 63/04; H04L 63/029; H04L 29/12216; H04L 63/102; G06F 21/577
USPC .................................. 709/222, 229; 726/15
See application file for complete search history.

(56) References Cited

U.S. PATENT DOCUMENTS

| | | | |
|---|---|---|---|
| 7,191,447 B1* | 3/2007 | Ellis et al. .................... 719/310 |
| 7,949,110 B2* | 5/2011 | Abichandani et al. .. 379/106.01 |
| 8,356,087 B1* | 1/2013 | Miller ................ H04L 63/0272 |
| | | | 709/220 |
| 8,667,293 B2* | 3/2014 | Birtwhistle et al. .......... 713/182 |
| 8,763,033 B2* | 6/2014 | Dittus ............................. 725/34 |
| 9,207,953 B1* | 12/2015 | Shokhor ............ G06F 9/44505 |
| 2002/0026578 A1* | 2/2002 | Hamann et al. .............. 713/159 |
| 2006/0184647 A1* | 8/2006 | Dixit et al. .................... 709/219 |
| 2008/0104046 A1* | 5/2008 | Singla et al. ..................... 707/4 |
| 2009/0222906 A1* | 9/2009 | Brandstatter ................... 726/15 |
| 2010/0299740 A1* | 11/2010 | Sheldon et al. ................ 726/12 |
| 2012/0023325 A1* | 1/2012 | Lai ..................... H04L 63/0272 |
| | | | 713/155 |
| 2012/0023570 A1* | 1/2012 | Gorodyansky ................ 726/12 |

(Continued)

OTHER PUBLICATIONS

Chowdhury, N.M.M.K. ; Boutaba, R., Network virtualization: state of the art and research challenges , Jul. 31, 2009, IEEE, Communications Magazine, IEEE (vol. 47 , Issue: 7 ), pp. 20-26.*

(Continued)

*Primary Examiner* — Tonia L Dollinger
*Assistant Examiner* — Dixon Dabipi
(74) *Attorney, Agent, or Firm* — Baker & Hostetler LLP (57) ABSTRACT

A system includes a configuration server, a client device, and a VPN system. The configuration server is configured to send a configuration profile to a client device. The configuration profile is configured to cause the client device to connect to a VPN system without user input and send network traffic through the VPN system. The client device is configured to receive the configuration profile and apply the received configuration profile such that the client device is configured to connect to the VPN system without user input and send network traffic through the VPN system. The VPN system is configured to receive the network traffic sent by the client device through the VPN system and record information about the network traffic sent by the client device through the VPN system.

18 Claims, 2 Drawing Sheets

(56) References Cited

U.S. PATENT DOCUMENTS

2013/0152176 A1* 6/2013 Courtney et al. .......... 726/5
2014/0366080 A1* 12/2014 Gupta et al. .............. 726/1

OTHER PUBLICATIONS

Wafaa Bou Diab, Samir Tohme, Carole Bassil, Critical vpn security analysis and new approach for securing voip communications over vpn networks, 2007, ACM, Proceedings of the 3rd ACM workshop on Wireless multimedia networking and performance modeling, pp. 92-96.*

De Turck, F. ; Vanhastel, S. ; Vandermeulen, F. ; Demeester, P. , Design and implementation of a generic connection management and service level agreement monitoring platform supporting the virtual private network service, 2001, IEEE, 2001 IEEE/IFIP International Integrated Network Management Proceedings.*

* cited by examiner

DEVICE METERING

CLAIM OF PRIORITY

This application claims priority to U.S. Application No. 61/546,670, filed on Oct. 13, 2011, the contents of which are incorporated by reference herein.

BACKGROUND

Internet audience measurement may be useful for a number of reasons. For example, some organizations may want to be able to make claims about the size and growth of their audiences or technologies. Similarly, understanding consumer behavior, such as how consumers interact with a particular web site or group of web sites, may help organizations make decisions that improve their traffic flow or the objective of their site. In addition, understanding Internet audience visitation and habits may be useful in supporting advertising planning, buying, and selling.

SUMMARY

In one aspect, a system includes a configuration server, a client device, and a VPN system. The configuration server is configured to send a configuration profile to a client device. The configuration profile is configured to cause the client device to connect to a VPN system without user input and send network traffic through the VPN system. The client device is configured to receive the configuration profile and apply the received configuration profile such that the client device is configured to connect to the VPN system without user input and send network traffic through the VPN system. The VPN system is configured to receive the network traffic sent by the client device through the VPN system and record information about the network traffic sent by the client device through the VPN system.

Implementations may include one or more of the following features. For example, the configuration profile may include authentication information for connecting to the VPN. The authentication information may include a root certificate and a user certificate, wherein the user certificate includes a unique identifier for the client device. The identifier may be associated with demographic or household information provided by a user during a registration process.

The VPN system may include a proxy server and the network traffic received by the VPN system passes through the proxy server. The proxy server may be configured to record information about the network traffic sent by the client device through the VPN system and send the recorded information to a collection server.

The configuration profile may include proxy connection information that specifies a proxy server that is part of the VPN system. The client device may be configured to apply the received configuration profile such that the client device is configured to send network traffic through the proxy server after connecting to the VPN system.

The VPN system may include an authorization management server configured to associate a private IP address with the client device such that the client device is assigned the private IP address whenever the client device connects to the VPN system. The configuration profile may be configured to cause the client device to send a unique identifier to the VPN system when the client device is connecting to the VPN system and to associate the private IP address with the client device such that the client device is assigned the private IP address whenever the client device connects to the VPN system, the authorization management server is configured to associate the private IP address with the unique identifier for the client device.

The network traffic may include HTTP requests for resources and the VPN system is configured to record information about the HTTP requests and subsequent responses.

In another aspect, a method includes sending a configuration profile to a client device such that the client device receives the configuration profile and applies the configuration profile to configure the client device to connect to a VPN system without user input and send network traffic through the VPN system; receiving, at the VPN system, the network traffic sent by the client device through the VPN system; and recording, at the VPN system, information about the network traffic sent by the client device through the VPN system.

Implementations may include one or more of the following. For example, the configuration profile may include authentication information for connecting to the VPN. The authentication information may include a root certificate and a user certificate, wherein the user certificate includes a unique identifier for the client device. The identifier may be associated with demographic or household information provided by a user during a registration process.

The VPN system may include a proxy server and the network traffic received by the VPN system passes through the proxy server. The proxy server may be configured to record information about the network traffic sent by the client device through the VPN system and send the recorded information to a collection server.

The configuration profile may include proxy connection information that a proxy server that is part of the VPN system. Sending the VPN configuration profile to the client device may include sending the VPN configuration profile to the client device such that the client device receives the configuration profile and applies the configuration profile to configure the client device to send network traffic through the proxy server after connecting to the VPN. Receiving, at the VPN system, the network traffic sent by the client device through the VPN system may include receiving the network traffic at the proxy server.

The method may include associating a private IP address with the client device and assigning the private IP address to the client device whenever the client device connects to the VPN system. The configuration profile may be configured to cause the client device to send a unique identifier to the VPN system when the client device is connecting to the VPN system. Associating the private IP address with the client device may include associating the private IP address with the unique identifier for the client device.

The network traffic may include HTTP requests for resources. Recording information about the network traffic sent by the client device through the VPN system may include recording information about the HTTP requests and subsequent responses.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

In various implementations of the techniques describe in this document, Internet traffic on mobile devices can be observed and analyzed by automatically configuring the end users' mobile devices to route traffic through a proxy server on a virtual private network (VPN) without prompting the user to manually configure the VPN or proxy and without requiring the user to continuously re-enter VPN authentication information. The observed information may be used to perform Internet audience measurement.

Figure 1:
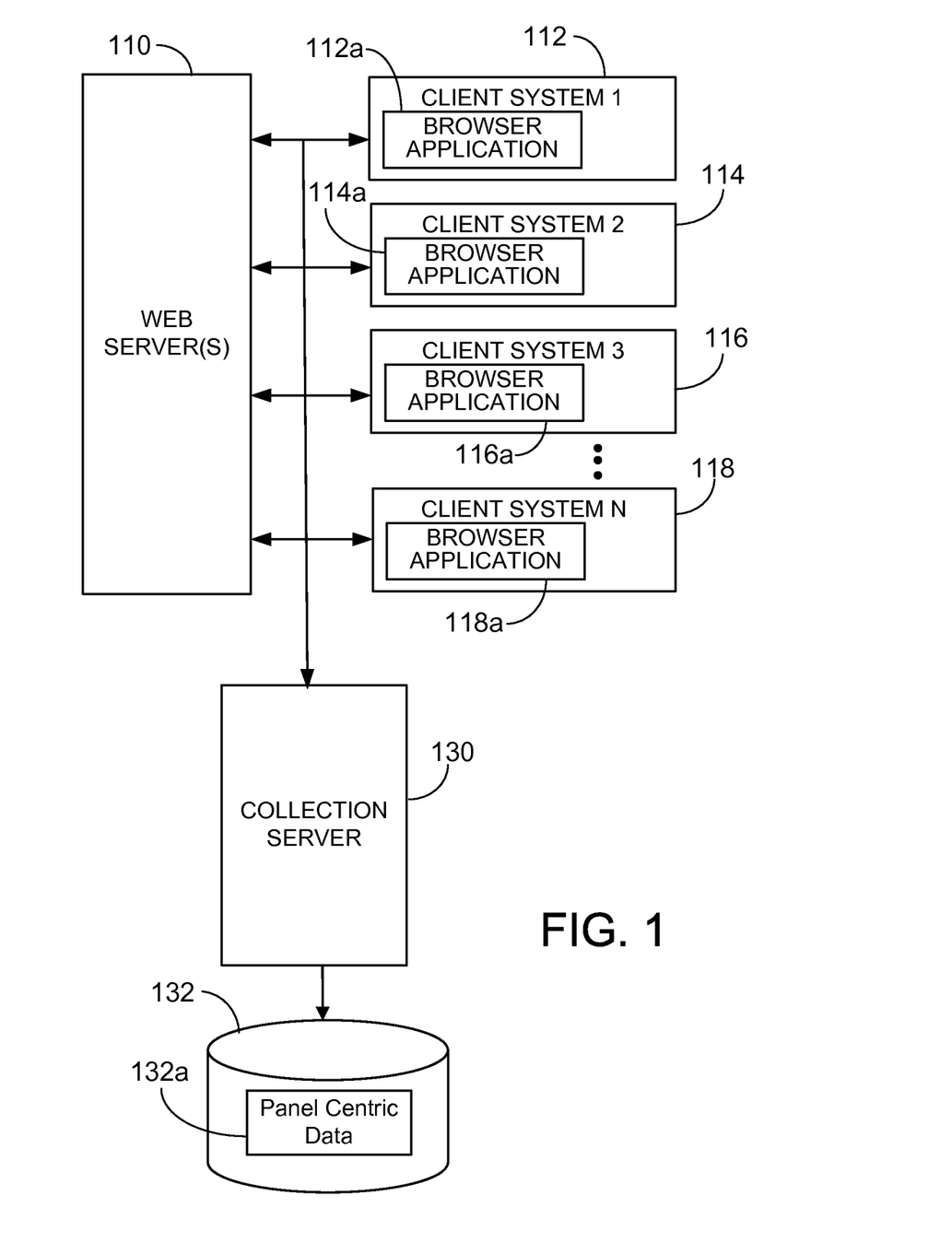
FIG. 1 illustrates a system in which a panel of users is used to collect data for Internet audience measurement.

FIG. 1 illustrates an example of a system 100 in which a panel of users may be used to collect data for Internet audience measurement. The system 100 includes client systems 112, 114, 116, and 118, one or more web servers 110, a collection server 130, and a database 132. In general, the users in the panel employ client systems 112, 114, 116, and 118 to access resources on the Internet, such as webpages located at the web servers 110. Information about this resource access is collected by the collection server 130. This information may be used to understand the usage habits of the users of the Internet.

Generally, each of the client systems 112, 114, 116, and 118, the collection server 130, and the web servers 110 may be implemented using, for example, a general-purpose computer capable of responding to and executing instructions in a defined manner, a personal computer, a special-purpose computer, a workstation, a server, or a mobile device. Client systems 112, 114, 116, and 118, collection server 130, and web servers 110 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 112, 114, 116, and 118, collection server 130, and web servers 110.

In the example shown in FIG. 1, the system 100 includes client systems 112, 114, 116, and 118. However, in other implementations, there may be more or fewer client systems. Similarly, in the example shown in FIG. 1, there is a single collection server 130. However, in other implementations there may be more than one collection server 130.

The users of the client systems 112, 114, 116, and 118 are a group of users that are a representative sample of the larger universe being measured, such as the universe of all Internet users, all Internet users in a geographic region, or all Internet users using a particular type of device (for example, mobile device). To understand the overall behavior of the universe being measured, the behavior from this sample is projected to the universe being measured. The size of the universe being measured and/or the demographic composition of that universe may be obtained, for example, using independent measurements or studies. For example, enumeration studies may be conducted monthly (or at other intervals) using random digit dialing.

Similarly, the client systems 112, 114, 116, and 118 are a group of client systems that are a representative sample of the larger universe of client systems being used to access resources on the Internet. As a result, the behavior on a machine basis, rather than person basis, can also be, additionally or alternatively, projected to the universe of all client systems accessing resources on the Internet. The total universe of such client systems may also be determined, for example, using independent measurements or studies The users in the panel may be recruited by an entity controlling the collection server 130, and the entity may collect various demographic information regarding the users in the panel, such as age, sex, household size, household composition, geographic region, number of client systems, and household income. The techniques used to recruit users may be chosen or developed to help insure that a good random sample of the universe being measured is obtained, biases in the sample are minimized, and the highest manageable cooperation rates are achieved. Once a user is recruited, the user's client system is modified in a manner that enables the collection server 130 to collect information about the user's use of the client system to access resources on the Internet and sends that information. For example, the collection server 130 may be able to collect information regarding requests for resources sent from the client system and subsequent responses, such as information regarding HTTP requests and subsequent HTTP responses.

Accordingly, when a user of one of the client systems 112, 114, 116, or 118 employs, for example, a browser application 112a, 114a, 116a, or 118a to visit and view web pages, information about these visits may be collected by the collection server 130. For instance, the collection server may collect the URLs of web pages or other resources accessed, the times those pages or resources were accessed, and an identifier associated with the particular client system on which the monitoring application is installed (which may be associated with the demographic information collected regarding the user or users of that client system). The collection server 130 may also collect information about the requests for resources and subsequent responses. For example, the collection server 130 may collect the cookies sent in requests and/or received in the responses. The collection server 130 aggregates this information and stores this aggregated information in the database 132 as panel centric data 132a.

The panel centric data 132a may be analyzed to determine the visitation or other habits of users in the panel, which may be extrapolated to the larger population. The information collected during a particular usage period (session) can be associated with a particular user of the client system (and/or his or her demographics) that is believed or known to be using the client system during that time period. Identifying the individual using the client system may allow the usage information to be determined and extrapolated on a per person basis, rather than a per machine basis. In other words, doing so allows the measurements taken to be attributable to individuals across machines within households, rather than to the machines themselves.

To extrapolate the usage of the panel members to the larger universe being measured, some or all of the members of the panel are weighted and projected to the larger universe. In some implementations, a subset of all of the members of the panel may be weighted and projected. For instance, analysis of the received data may indicate that the data collected from some members of the panel may be unreliable. Those members may be excluded from reporting and, hence, from being weighted and projected. As another example, the desired reporting sample may be those users that employ certain devices, such as mobile devices. In such a situation, the users, if any, of other devices may be excluded from the reporting The reporting sample of users (those included in the weighting and projection) are weighted to insure that the reporting sample reflects the demographic composition of the universe of users to be measured, and this weighted sample is projected to the universe of all users. This may be accomplished by determining a projection weight for each member of the reporting sample and applying that projection weight to the usage of that member. Similarly, a reporting sample of client systems may be projected to the universe of all client systems by applying client system projection weights to the usage of the client systems. The client system projection weights are generally different from the user projection weights.

The usage behavior of the weighted and projected sample (either user or client system) may then be considered a representative portrayal of the behavior of the defined universe (either user or client system, respectively). Behavioral patterns observed in the weighted, projected sample may be assumed to reflect behavioral patterns in the universe.

Estimates of visitation or other behavior can be generated from this information. For example, this data may be used to estimate the number of unique visitors (or client systems) visiting certain web pages or groups of web pages, or unique visitors within a particular demographic visiting certain web pages or groups of web pages. This data may also be used to determine other estimates, such as the frequency of usage per user (or client system), average number of pages viewed per user (or client system), and average number of minutes spent per user (or client system).

Figure 2:
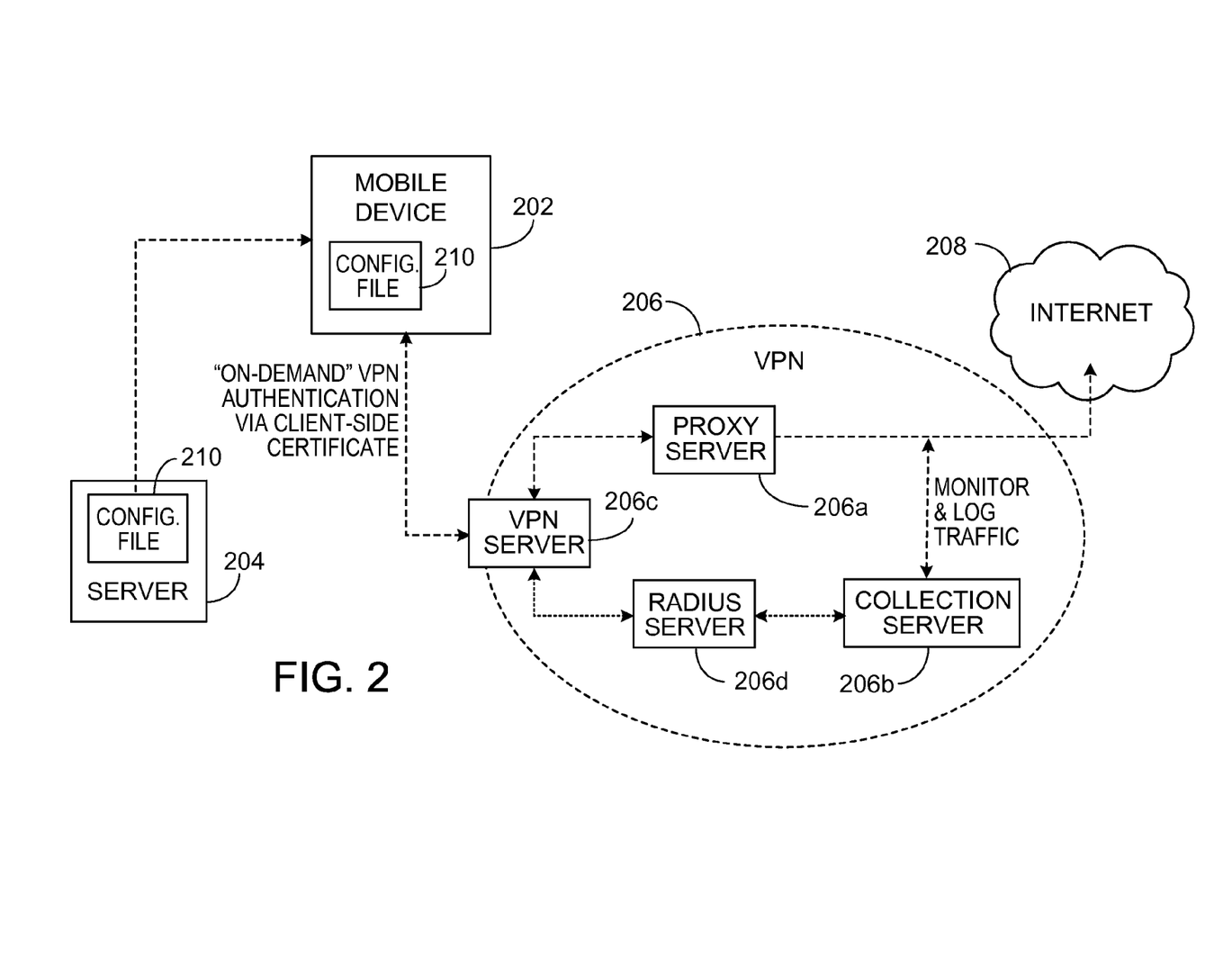
FIG. 2 illustrates an example of a system that generally provides for the collection and analysis of data regarding the use of web resources by, for example, a panel of users.

FIG. 2 illustrates an example of a system 200 that provides for the collection and analysis of data regarding the access of network resources by, for example, a panel of users that employ devices which provide third parties with limited access to network traffic information. The collection and analysis of this data may yield analytics regarding the habits of users viewing webpages or other network content, as described above.

The example shown in FIG. 2 is directed to an implementation in which a client system 202 is a mobile device running the Apple® iOS operating system, which currently does not grant access to Internet traffic information, such as web browser log files, to third parties. In the particular example shown in FIG. 2, the system 200 enables the automatic configuration of a mobile device 202 running Apple's iOS operating system (hereafter an "iOS device"), to funnel all Internet traffic through a secure virtual private network (VPN) 206 such that the Internet traffic can be logged centrally and in real-time. In the example shown, the VPN 206 includes a proxy server 206a, a collection server 206b, a VPN server 206c, and an authorization management server 206d. In addition to the mobile device 202 and the VPN 206, the system 200 includes a configuration server 204 and the Internet 208.

In particular, a user can configure the mobile device 202 to connect to the VPN 206 through the use of a configuration profile 210. The configuration profile may be an XML file that specifies different configuration settings of the mobile device 202 for connecting to the VPN 206 and, when appropriate, proxy server 206a. When implemented as a file, the configuration profile 210 may also be referred to as a configuration file 210. An example of a configuration profile implemented as an XML file is included at the end of this document. While the configuration profile 210 can be obtained through a variety of methods, the example shown in FIG. 2 employs a configuration server 204 that sends the configuration profile 210 to the mobile device.

For example, the user can download the configuration profile 210 from the configuration server 204 by registering on a website, which may or may not be hosted by the configuration server. The website can be a public website or a secure website requiring authentication. The website may be associated with a third party research organization. The user can register to download the configuration profile 210 by providing demographic information, such as name, address, occupation, income, etc., on the website. The website may also request additional information such as household income. Once a user provides demographic and/or household information, a configuration profile may be dynamically generated using at least some of the information provided by the user. This configuration profile may then be sent from the configuration server 204 to the mobile device 202.

For instance, if the website is not accessed through the mobile device itself, a server associated with the website may send a message to the mobile device that includes a link to download the configuration profile 210 from the configuration server. The message may be any appropriate form of communication, including a text message, email, or multimedia message. If the website is accessed through the mobile device, then the configuration profile 210 may be directly downloaded from the configuration server 204 onto the mobile device (for example, by an over the air, or "OTA," download).

As another example, the user can download the configuration profile 210 through an application installed on the mobile device 202. The user may register to download the configuration profile 210 by providing demographic and household information into the application in a manner similar to the website described above. Once a user provides demographic and/or household information, a configuration profile 210 may be dynamically generated using at least some of the information provided by the user. The application may automatically download the configuration profile 210 from the configuration server 204 to the mobile device 202.

Once the configuration profile 210 is downloaded, the user may install it on the mobile device 202. For instance, if a message is sent to the mobile device 202 with a link to the configuration profile 210, the user may click on the link to the file, which results in an installation dialog screen being presented to the user once the configuration profile 210 is downloaded. Alternatively, the configuration profile 210 may automatically install itself on the mobile device 202 after it is downloaded without any input from the user. In some cases, the downloaded configuration profile 210 may replace another, older version of the file on the mobile device 202, and thereby install and change the settings of the mobile device 202 without any execution at all. The operating system of the mobile device 202 may, when appropriate, request the user to confirm the changes made by the configuration profile 210 before it is installed.

Once the configuration profile 210 is downloaded and installed, the configuration profile 210 may change the settings of the mobile device 202 to route all Internet traffic through the VPN 206. In one implementation, the configuration profile 210 includes the authentication information necessary to connect to the secure VPN 206. This authentication information may involve installing a root certificate on the mobile device 202. In addition, the configuration profile 210 may also install a user certificate for the VPN 206 on the mobile device 202. The user certificate may include an identifier that is unique to the particular mobile device 202 and acts as an effective username (for example, the unique identifier may be included in the "common name" field of the user certificate). The unique identifier may be associated with the demographic or household information provided by the user during registration. In addition, the configuration profile 210 may also provide the hostname associated with the VPN 206. When appropriate, the configuration profile 210 may also include proxy connection information, such as information specifying the identity of the proxy server 206a on the VPN 206. The proxy connection information may also direct different users to different proxy servers and specify a list of multiple possible proxy servers to use. These features may provide load distribution and fault tolerance among multiple proxy servers.

In addition, the configuration profile may configure the mobile device 202 such that the mobile device 202 automatically (that is, without the need for user input) connects to the VPN 202 whenever the mobile device 202 attempts to access the Internet 208. For example, on the iOS platform, the IPSec client currently has an 'on demand' feature which causes the VPN connection to be automatically established whenever the device attempts to connect to a specified list of domains. To detect whether the device is trying to connect to one of the specified domains, the iOS platform performs simple string matching starting from the right-most position of the domain. Therefore, one manner of causing the mobile device 202 to connect to the VPN for all Internet traffic is to specify a list that is all letters a-z.

Once the configuration profile 210 is properly installed, the mobile device 202 will automatically connect to the secure VPN 206 using the VPN server 206c and direct all Internet traffic through the VPN 206. For instance, in one implementation, whenever the mobile device 202 needs to use the Internet, the device 202 first attempts to connect to the secure VPN 206. If the mobile device 202 is not already connected to the VPN 206 (such as, for example, if the device 202 has just booted up or if the VPN 206 was previously disconnected due to an inactivity timeout), the mobile device 202 automatically starts a VPN 206 connection and uses the authentication information installed by the configuration profile 210 (such as, for example, the root certificate and the user certificate) to connect to the secure VPN 206 without prompting the user to initiate the VPN 206 connection or to provide any authentication information.

In general, there may be two phases to VPN authentication. In phase 1, IPSec authentication may be performed between the mobile device 202 and the VPN server 206c to establish the secure VPN tunnel. Phase 2 then involves individual user authentication. In some implementations, certificate authentication may be used during phase 1, while phase 2 is disabled. In this case, to establish the secure connection with the VPN 206, the mobile device 202 simply performs IPSec authentication with the VPN server 206c using the root certificate and user certificate. User authentication is not needed. Disabling phase 2 may obviate the need for the user to enter a password since, in some cases in which phase 2 is not disabled, a user may still be prompted for a password, even with 'on demand' VPN connection enabled.

The authorization management server 206d may be used to help uniquely identify panelists/mobile devices in the logs of the Internet traffic. In some VPN setups, users may be assigned a random private IP address from a pool. In this scenario, it may be difficult if not impossible to uniquely identify users/mobile devices across multiple connections to the VPN because the private IP address for a given mobile device may change in a random fashion across the multiple connections. To reduce or eliminate this issue, some implementations may use an authorization management server 206d, such as a RADIUS server (otherwise known as an AAA server, or Authorization, Authentication, and Accounting server), to assign specific private IP addresses per user/mobile device. The authorization management server 206d may have a database or other data store that stores associations between private IP addresses and the unique identifiers in the user certificates.

In this case, the mobile device 202 sends the user certificate to the VPN server 206c to establish the secure VPN tunnel with the VPN 206. The VPN server 206c communicates with the authorization management server 206d to determine what private IP address to assign to the mobile device 202c. To that end, the VPN server 206c may send to the authorization management server 206d the unique identifier in the common name field of the user certificate received from the mobile device 202c. The authorization management server 206d determines the private IP address associated with the unique identifier, and returns the private IP address to the VPN server 206c, which assigns that private IP address to the mobile device 202 and establishes the secure VPN tunnel. Because the same IP address is assigned to the mobile device 202 each time the device 202 connects to the VPN, the activity of the same device 202 can be identified across VPN connections by identifying the IP address. As described below, the proxy server 206a may use further use this association to include the unique identifier in the logs of the mobile device's Internet activity.

The private IP addresses may be associated with unique identifiers before the certificates are distributed to the mobile devices, or the private IP addresses may be associated with unique identifiers as needed. In other words, in one case, the certificates may be generated, and a private IP address may be associated with each certificate before the certificate is distributed to a mobile device. Those associations are then stored by the accounting management system 206d such that a given mobile device is assigned the private IP address associated with the mobile device's certificate whenever the device connects to the VPN, even if it is the first time the device connects. In another case, a private IP address may be assigned to a given mobile device the first time the mobile device connects to the VPN 206, and the accounting management system may associate that private IP address with the unique identifier in the mobile device's certificate so that the mobile device is assigned the IP address again in the future.

In addition to sending the unique identifier to the authorization management server 206d, the VPN server 206c may send the public IP address of the mobile device 202 to the authorization management server 206d. The authorization management server 206d may then store the public IP address in association with the unique identifier and the private IP address, as well as information such as the time and date the mobile device 202 connected to the VPN.

Once the connection to the secure VPN 206 is established (or if the connection was already active), the mobile device 202 may also use the configuration profile 210 to automatically configure the appropriate proxy settings (if needed and not already done) to use the proxy server 206a that is a member of the secure VPN 206. When the proxy server 206a is used, requests from the mobile device 202 may be passed through the proxy server 206a to their destination on the Internet 208, and responses to those requests may be passed through the proxy server 206a on their way to the mobile device 202.

When the proxy server 206a is employed, all Internet traffic may be passed through the proxy server 206a and the proxy server 206a may be configured to observe and analyze all incoming and outgoing Internet traffic associated with the mobile device 202. In one implementation, the proxy server 206a may copy and log all incoming and outgoing Internet traffic associated with the mobile device 202, and then forward that information to collection server 206b. Alternatively, the proxy server 206a may only log certain types of Internet traffic, such as HTTP traffic, and forward that information to collection server 206b. The proxy server 206a may be configured for observing and analyzing Internet traffic using, for example, the techniques described in U.S. Pat. No. 7,181,412, which is incorporated herein by reference.

In some cases, proxy configuration may be needed on the mobile device 202. In those cases, the configuration profile may include the proxy information, and be used to configure the mobile device 202 to connect to the proxy server 206a, as described above. In other cases, however, proxy configuration need not be done on the mobile device 202. For instance, in some implementations, the VPN 206 may use a "transparent" proxy. In this case, the VPN 206 may automatically forward Internet traffic associated with the mobile device 202 through the proxy 206a to the destination without the need for the mobile device 202 to be configured to do so. The proxy server 206a automatically copies the Internet traffic information to the collection server 206b before forwarding the traffic to its destination on the Internet 208 or to the mobile device 202, depending on whether the traffic is incoming or outgoing traffic.

When the authorization management server 206d is used, the proxy server 206a may query the authorization management server 206d for the unique identifier associated with the private IP address when the mobile device 202 connects to the proxy server 206a using the private IP address. The proxy server 206a can then dynamically insert the unique identifier into the records of the mobile device's Internet traffic information. Associating the activity with the unique identifier allows the activity to be associated with the demographics collected for the user of the mobile device 202. To reduce negative performance impact on the proxy server 206a, the result of the query may be cached in memory with a very high time to live. The unique identifier may also be used to provide tailored content to the user, for example, on a registration website.

The proxy server 206a may also query the authorization management server 206d to obtain the public IP address associated with the mobile device 202 and append that to the records. The public IP address also may be included in the X-Forwarded-For HTTP request header for requests sent by the proxy server on behalf of the mobile device 202.

In addition to inserting the unique identifier in the records, the proxy server 206a may use the unique identifier to enforce a ban on certain mobile devices. In particular, if a user or mobile device associated with a particular unique identifier is banned, the proxy server 206a may disconnect or otherwise refuse a connection from that particular device once the proxy server 206a receives the unique identifier from the authorization management server 206d. Alternatively, or additionally, the mobile device 202 may be redirected to an uninstall page if the user or mobile device is banned.

In addition, the authorization management server 206d may log detailed accounting records each time a panelist connects/disconnects from the VPN. For example, this information may include the public IP address of the mobile device 202 and the time and date the mobile device 202 connected to the VPN 206 or was disconnected. This data may be used in various ways, such as determining the first time a user connects to the VPN 206. Determining the first time the user connects to the VPN 206 may be useful, for example, to send the user a welcoming e-mail once they join the panel, or to verify the user joined the panel.

A number of variations of system 200 may be used. For example, a proxy server 206a may not be used in some implementations, with requests and responses being passed straight through without modification and the Internet traffic being logged by a component of the VPN 206. That component may also interact with the authorization management server 206d in the same manner as described above with respect to the proxy server 206a. In addition, while the proxy server 206a and collection server 206b in system 200 are separate servers, in other implementations the proxy server 206a and collection server 206b may be implemented as a single server that appropriately handles the Internet traffic for mobile device 202 and performs the appropriate logging.

In some implementations, rather than looking up the unique identifier and appending the unique identifier to the records for the mobile device 202 as the records are recorded, the logs can be created without the unique identifier and the association can be used to later determine the unique identifier associated with the private IP address. In some implementations, the authorization management server may not be used at all.

In some implementations, the techniques described above may provide certain advantages. For example, the techniques above may obviate the need for a user to manually establish the connection to the VPN each time the mobile device needs to communicate over the Internet. In many instances, a user must manually start a VPN session, and also enter authentication information each time the VPN connection is to be made. This process may require that the user manually enter information such as username, VPN name, and password. Furthermore, VPN connections usually time-out after a predetermined amount of time, requiring the user to again manually re-connect to the VPN and re-enter authentication information when the mobile device needs to communicate over the Internet. Certain implementations of the techniques above may provide a system that automatically establishes and authenticates a VPN connection, and thereby does not re-prompt the user for authentication information each time the mobile device connects to the VPN.

Automatically (that is, without user input) establishing the VPN connection and performing authentication may be particularly advantageous for some mobile devices that can connect to different underlying (relative to the VPN) networks. For example, some mobile devices may use wireless technology, such as Wi-Fi to connect to different wireless networks, as well as cellular technology to connect to a cellular network. Each time the device connects to an underlying network, a new connection to the VPN may need to be established. Automatically establishing and authenticating the VPN connection in such environments may make the use of the VPN transparent to the user.

In addition, using a proxy server in conjunction with a VPN may enable a single proxy configuration to be used for all Wi-Fi and 3G network connections. This may prevent the user from having to manually re-enter proxy information each time a mobile device connects to a new underlying network.

Implementations of the techniques described above may obviate the need for a user to manually set up the proxy settings on the device 202 in order for the mobile device 202 to connect through the proxy server 206a. This may be advantageous since, for most users, manually changing the proxy settings on mobile devices is often an onerous and time-consuming task, requiring the user to have both the technical understanding of how to configure the proxy settings on the mobile device 202 as well as the time to do so.

Moreover, oftentimes even if a user has the technical know-how and the time to configure proper proxy settings on the mobile device or even if proxy settings can be automatically configured on the device, on most mobile devices those proxy settings may need to be re-configured each time the mobile device connects to a new underlying network (although a proxy may not need be reconfigured for subsequent connections, depending on the mobile device). In this case, implementations of the techniques described above may obviate the need for the user to set the proxy settings each time the device 202 is on a different underlying network.

Also, when the VPN and proxy server are used together, the VPN may secure the proxy server. Without the VPN, a metering system may either need to require a user to configure proxy authentication credentials or, if the proxy was left open, fight against proxy spammers.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

The following is an example of a configuration profile.

```
<?xml version="1.0" encoding="UTF-8"?>
<!DOCTYPE plist PUBLIC "-//Apple//DTD PLIST 1.0//EN"
"http://www.apple.com/DTDs/PropertyList-1.0.dtd">
<plist version="1.0">
<dict>
   <key>PayloadContent</key>
   <array>
      <dict>
         <key>IPSec</key>
         <dict>
            <key>AuthenticationMethod</key>
            <string>Certificate</string>
            <key>OnDemandEnabled</key>
            <integer>1</integer>
            <key>OnDemandMatchDomainsAlways</key>
            <array>
               <string>a</string>
               <string>b</string>
               <string>c</string>
               <string>d</string>
               <string>e</string>
               <string>f</string>
               <string>g</string>
               <string>h</string>
               <string>i</string>
               <string>j</string>
               <string>k</string>
               <string>l</string>
               <string>m</string>
               <string>n</string>
               <string>o</string>
               <string>p</string>
               <string>q</string>
               <string>r</string>
               <string>s</string>
               <string>t</string>
               <string>u</string>
```

-continued

```
            <string>v</string>
            <string>w</string>
            <string>x</string>
            <string>y</string>
            <string>z</string>
        </array>
        <key>PayloadCertificateUUID</key>
        <string>192aef81-e1d6-4a7b-a1c6-4780a383e6ea</string>
        <key>PromptForVPNPIN</key>
        <false/>
        <key>RemoteAddress</key>
        <string>vpn.domain.com</string>
    </dict>
    <key>IPv4</key>
    <dict>
        <key>OverridePrimary</key>
        <integer>0</integer>
    </dict>
    <key>PayloadDescription</key>
    <string>Configures VPN settings, including authentication.</string>
    <key>PayloadDisplayName</key>
    <string>VPN Configuration</string>
    <key>PayloadIdentifier</key>
    <string>com.company.vpn1</string>
    <key>PayloadOrganization</key>
    <string>Organziation Name</string>
    <key>PayloadType</key>
    <string>com.apple.vpn.managed</string>
    <key>PayloadUUID</key>
    <string>192aef81-eld6-4a7b-alc6-4780a383e6ea</string>
    <key>PayloadVersion</key>
    <integer>1</integer>
    <key>Proxies</key>
    <dict>
        <key>HTTPEnable</key>
        <integer>0</integer>
        <key>HTTPSEnable</key>
        <integer>0</integer>
        <key>ProxyAutoConfigEnable</key>
        <integer>1</integer>
        <key>ProxyAutoConfigURLString</key>
        <string>http://proxy.configuration.com/proxy.pac</string>
        <key>ProxyAutoDiscoveryEnable</key>
        <integer>0</integer>
    </dict>
    <key>UserDefinedName</key>
    <string>VPN Connection Name</string>
    <key>VPNType</key>
    <string>IPSec</string>
</dict>
<dict>
    <key>Password</key>
    <string>Password to encrypt user certificate</string>
    <key>PayloadCertificateFileName</key>
    <string></string>
    <key>PayloadContent</key>
    <data>
MIIK4QIBAzCCCqcGCSqGSIb3DQEHAaCCCpgEggqUMIIKkDCCBUcGCSqGSIb3DQEHBqCCBTgwggU0
AgEAMIIFLQYJKoZIhvcNAQcBMBwGCiqGSIb3DQEMAQYwDgQIghl2WEDEM0MCAggAgIIFAFkwNUu/
6yfLEqx1bzjjcNjd8+c9EydG0iaEd55nbDq0XAF6cWlrmX4K9MlpfP2zm11eflzLyaFPLJhWVj0v
aYTIa+4rZkW7hzz0LJEKeiKeWH/uQCIDBSvU/R+mJMe9V2EZqiTc1GZQYSdABIJ/6z3xFifMOdWV
U1mwKMltTUJIQMq2JY4BCSRvuKCZNBptOQJbPOxxdXAKqfHdMbwJmeZWamFR5b0qj6YnFtOb1eNy
9DXC6OPc+njOZBALV2aw2Z1VZxmvrZIGBFOLDnLJWHn8ej8e+8BBjgiFfLv98IJPBZbK44pLksRq
ONUNssrEQb6fKAaJMmGoImFfnD8TonsvObXkKkgeVO4vs2d8F/tredcSLFuVJeOS5oizWRbqiLIx
eBtUQ8/gc8Eqpz6XycDssXtPRj/m3qujSewsIL8ZE77KOx/neK8ThP30qs5XAr58c6AIFME6jKDM
6X8Of6xBvd8gFBnZxzY80N2NVF6BR0kQfJRK/+9t1WrWzb6esv8y7/d+7LdMbQLlupUZffqza0IU
is2eE58z5bXQIBOWkuIEF2YV3D+azL/Fgv6FZzNmtPrTmWhd8UII0Qn3fQVXH5/++GPiFCfGKLWt
```

-continued

```
Cximx5qVALaUIt5qopjjMNltYhL88QkF1oCtCo0NbbJ1rnT6Ny+5N0Dh3YAZa04YLTwLkL
cQGWkn
eDH8yjf3yaqUPiZQZbMablgJuEnvAt2TIVZ0Pmlqf+gn3/a1DdEhibeBS6yBd13RJcYCg/
YZJfHy
8SAcdRq9fLdzIMfBMhOHUCzFvgR6Yb/AJB3aM1A55W74c71Y7HylTCg2oiGCmHFwHPHkgr
4ND8BR
39cDlTlmYZTewWCUyoPbh8aYAKCNN8K/03CY8wzYx29Ya9sFqMQdmMV0jKKnbq3PcqjZy7
0CkqqZ
RuX2nzjNUvQM8LJz+bFGmH3WhFApEWSJAQAnm15DdHpyhqpVGmK7AA67LBKTzhO94GYWhv
kt7dt2
y/xEVtgTGEOLIVzPH5u2mQnvCUkKj1ANGIvMMmyTV9diCUzB8h8jeyAvPwHIqa7/2LrjI/
ESp/49
Bc0qhx8X+eUzIAd9POJgC5ItpTUsHPYAVIDCkB9Pt74odkhQcdUWlyi2O2YRbzcsDv/6JS
gBuu0h
GmnlGDAyJ+supIZbs0USvsyImDDd4lRG3iJ+bbTHk6UaSSw6s6bj9rH3SQcP1u7CgBdBPy
2fSqJD
zoe4kstlKxb7fJDnhHjyPJNkYhb16QdT65GFSTA5xbpvYSnUEFwR3x7IyJo6YfTy8+MZMv
xe/+LL
3xLTuBig0kqWH7N6vF9cBpasa7tWRqUTlWBqtzZoOadbTqEl0bQx170qy3A0HJgfrXDm4Q
Vf+lBn
GvxB9WQUHRG9BLYiZRUYDgmMWqqS6lcbnx8YEjNuCWli++n0V5fnJP1ar1KmhZ0Bv+geba
XmzXZ/
+Wg2J-nr6VnLcx+uJrfv+nJm7weAgirS59Cpf6taqmBlToOnTsMZY51B2Nh9mxiK6ouZ/El
dD6/4V
Ys5KxF/ta7+4y3gbI7qwwRpKAbca4qsJn7ubpECurLDAQH8cb48fpF4VDKgwfABi44v4zK
5GjWMQ
WMG+dEKvHkT6gbA96CDUGZ+Ka+sxJTAjBgkqhkiG9w0BCRUxFgQUaBB6jnrB+BjH2tIbI/
jkBsBp
so8wMTAhMAkGBSsOAwIaBQAEFP6SzPoUx0cMiJ1UTkI8EfDfqrQgBAirK654mzrwzwICCA
A=
</data>
<key>PayloadDescription</key>
<string>Provides device authentication (certificate or
identity).</string>
<key>PayloadDisplayName</key>
<string>Username</string>
<key>PayloadIdentifier</key>
<string>com.company.credential2</string>
<key>PayloadOrganization</key>
<string>Organization Name</string>
<key>PayloadType</key>
<string>com.apple.security.pkcs12</string>
<key>PayloadUUID</key>
<string>192aef81-e1d6-4a7b-a1c6-4780a383e6ea</string>
<key>PayloadVersion</key>
<integer>1</integer>
</dict>
<dict>
<key>PayloadCertificateFileName</key>
<string></string>
<key>PayloadContent</key>
<data>
MIIFLTCCBBWgAwIBAgIJAO94HRPzB+/YMA0GCSqGSIb3DQEBBQUAMIG4MQswCQYD
VQQGEwJVUzEOMAwGA1UEERMFMjAxOTAxETAPBgNVBAgTCFZpcmdpbmlhMQ8wDQYD
VQQHEwZSZXN0b24xKTAnBgNVBAkTIDExOTUwIERlbW9jcmFjeSBEcml2ZSwgU3Vp
dGUgNjAwMRMwEQYDVQQKEwpUTVJHLCBJbmMuMRgwFgYDVQQLEw9Nb2JpbGVYcHJl
c3Npb24xGzAZBgNVBAMTEk1vYmLsZVhwomVzo2lvbiBDQTAeFw0xMTA4MjQyMTQx
NDBaFw000TEyMjcyMTQxNDBaMIG4MQswCQYDVQQGEwJVUzEOMAwGA1UEERMFMjAx
OTAxETAPBgNVBATICFZpcmdpbm1hMQ8wDQYDVQQHEwZSZXN0b24xKTAnBgNVBAkT
IDExOTUwIERlbW9jcmFjeSBEcm12ZSwgU3VpdGUgNjAwMRMwEQYDVQQKEwpUTVJH
CxMPTW9iaWxlWHByZXNzaW9uMRswGQYDVQQDExJNb2JpbGVYcHJlc3Npb24gQ0GC
CQDveB0T8wfv2DAMBgNVHRMEBTADAQH/MBMGA1UdJQQMMAoGCCsGAQUFBwMCMA0G
CSqGSIb3DQEBBQUAA4IBAQCk2zle//CJAggk2/y5FZec5D2sIrCTWgS9PjrIaMGH
ckEIRMtXiQtoKF21NNSUlHjZ9VfpsOHmcX5IJ/UTMoZVMgHylaxaJxH4kfYH9hkT
pVEiYk/ZyAacBc/rAYYyVjCe0bwRr055CGikTS9vN5FdNuJSSAPqhbDzLRWcpdY1
qTs1Gjv6ZfbFqqfWcyFPHo9/1Z7AqGnVa0JDAKFO80eCrU2ZJT4cnjQ4sSxKDABM
3rZc76Y6Wbx/UrxXrmui/hjQC9Cau4oJ10TYGp3vbw58AaMvo4peF+a3LWodHGcW
6CbAHEwPOK6dHP1rkoQ14aYnm9XeUno37CJMKyJ8XYSa
</data>
<key>PayloadDescription</key>
<string>Provides device authentication (certificate or
identity).</string>
<key>PayloadDisplayName</key>
<string>Root Certificate CA</string>
<key>PayloadIdentifier</key>
<string>com.company.credential3</string>
<key>PayloadOrganization</key>
<string>Organization Name</string>
<key>PayloadType</key>
```

-continued

```
      <string>com.apple.security.root</string>
      <key>PayloadUUID</key>
      <string>192aef81-eld6-4a7b-alc6-4780a383e6ea</string>
      <key>PayloadVersion</key>
      <integer>1</integer>
    </dict>
  </array>
  <key>PayloadDescription</key>
  <string>A description of the configuration profile</string>
  <key>PayloadDisplayName</key>
  <string>Configuration Profile Name</string>
  <key>PayloadIdentifier</key>
  <string>com.company</string>
  <key>PayloadOrganization</key>
  <string>Organization Name</string>
  <key>PayloadRemovalDisallowed</key>
  <false/>
  <key>PayloadType</key>
  <string>Configuration</string>
  <key>PayloadUUID</key>
  <string>192aef81-eld6-4a7b-alc6-4780a383e6ea</string>
  <key>PayloadVersion</key>
  <integer>1</integer>
</dict>
</plist>
```

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

What is claimed is:

1. A system comprising:
a configuration server configured to:
send a configuration profile to a client device, the configuration profile being configured to cause the client device to:
detect that a request to a specific domain has been issued,
based on information in the configuration profile, determine that, for any domain to which a request has been issued, a connection to a VPN system should first be established,
connect to the VPN system without user input and relay the request to the specific domain through the VPN system to which a connection has been established;
the client device configured to:
receive the configuration profile;
apply the received configuration profile such that the client device is configured to:
detect that a request to a specific domain has been issued,
determine that, for any domain to which a request has been issued, a connection to the VPN system should be first be established,
connect to the VPN system without user, and
relay the request to the specific domain via the VPN system to which a connection has been established; and
the VPN system configured to:
receive the request sent by the client device through the VPN system;
record information about the request sent by the client device through the VPN system; and
relay the request to the specific domain, wherein:
the configuration profile includes information about domains to which the client device issues requests and proxy connection information that specifies a proxy server that is part of the VPN system;
the client device is configured to apply the received configuration profile such that the client device is configured to relay the request through the proxy server after connecting to the VPN system.

2. The system of claim 1 wherein the configuration profile includes authentication information for connecting to the VPN.

3. The system of claim 2 wherein the authentication information includes a root certificate and a user certificate, wherein the user certificate includes a unique identifier for the client device.

4. The system of claim 3 wherein the identifier is associated with demographic or household information provided by a user during a registration process.

5. The system of claim 1 wherein the VPN system includes a proxy server and the network traffic received by the VPN system passes through the proxy server.

6. The system of claim 5 wherein the proxy server is configured to record information about the network traffic sent by the client device through the VPN system and send the recorded information to a collection server.

7. The system of claim 1 wherein the VPN system includes an authorization management server configured to associate a private IP address with the client device such that the client device is assigned the private IP address whenever the client device connects to the VPN system.

8. The system of claim 7 wherein:
the configuration profile is configured to cause the client device to send a unique identifier to the VPN system when the client device is connecting to the VPN system; and
to associate the private IP address with the client device such that the client device is assigned the private IP address whenever the client device connects to the VPN system, the authorization management server is configured to associate the private IP address with the unique identifier for the client device.

9. The system of claim 1 wherein the network traffic includes HTTP requests for resources and the VPN system is configured to record information about the HTTP requests and subsequent responses.

10. A method comprising:
sending a configuration profile to a client device such that the client device receives the configuration profile and applies the configuration profile to configure the client device to:
 detect that a request to a specific domain has been issued,
 based on information in the configuration profile, determine that, for any domain to which a request has been issued, a connection to a VPN system should first be established,
 connect to the VPN system without user input and
 relay the request to the specific domain through the VPN system to which a connection has been established;
receiving, at the VPN system, the request sent by the client device through the VPN system;
recording, at the VPN system, information about the request sent by the client device through the VPN system; and
relaying the request to the specific domain,
wherein:
the configuration profile includes information about domains to which the client device issues requests proxy connection information that a proxy server that is part of the VPN system;
sending the VPN configuration profile to the client device includes sending the VPN configuration profile to the client device such that the client device receives the configuration profile and applies the configuration profile to configure the client device to relay the request through the proxy server after connecting to the VPN; and
receiving, at the VPN system, the request sent by the client device through the VPN system includes receiving the request at the proxy server.

11. The method of claim 10 wherein the configuration profile includes authentication information for connecting to the VPN.

12. The method of claim 11 wherein the authentication information includes a root certificate and a user certificate, wherein the user certificate includes a unique identifier for the client device.

13. The method of claim 12 wherein the identifier is associated with demographic or household information provided by a user during a registration process.

14. The method of claim 10 wherein the VPN system includes a proxy server, the method comprising passing the network traffic received by the VPN system through the proxy server.

15. The method of claim 14 wherein the proxy server is configured to record information about the network traffic sent by the client device through the VPN system and send the recorded information to a collection server.

16. The method of claim 10 comprising:
associating a private IP address with the client device; and
assigning the private IP address to the client device whenever the client device connects to the VPN system.

17. The method of claim 16 wherein:
the configuration profile is configured to cause the client device to send a unique identifier to the VPN system when the client device is connecting to the VPN system; and
associating the private IP address with the client device includes associating the private IP address with the unique identifier for the client device.

18. The method of claim 10 wherein:
the network traffic includes HTTP requests for resources; and
recording information about the network traffic sent by the client device through the VPN system includes recording information about the HTTP requests and subsequent responses.

\* \* \* \* \*